(12) United States Patent
Eglin et al.

(10) Patent No.: US 11,604,481 B2
(45) Date of Patent: Mar. 14, 2023

(54) METHOD FOR PILOTING A HYBRID HELICOPTER HAVING AN AIRFRAME MAINTAINED AT CONSTANT INCIDENCE BY REGULATING A POSITION OF AT LEAST ONE MOBILE TAIL UNIT SURFACE

(71) Applicant: AIRBUS HELICOPTERS, Marignane (FR)

(72) Inventors: Paul Eglin, Roquefort la Bedoule (FR); Remy Huot, Marseilles (FR); Martin Embacher, Neu-Ulm (DE); Antoine Conroy, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/540,780

(22) Filed: Dec. 2, 2021

(65) Prior Publication Data
US 2022/0187849 A1 Jun. 16, 2022

(30) Foreign Application Priority Data

Dec. 10, 2020 (FR) ...................................... 2012979

(51) Int. Cl.
*B64C 27/22* (2006.01)
*B64C 13/16* (2006.01)
(Continued)

(52) U.S. Cl.
CPC ............. *G05D 1/0816* (2013.01); *B64C 5/10* (2013.01); *B64C 11/00* (2013.01); *B64C 11/30* (2013.01);
(Continued)

(58) Field of Classification Search
CPC .......... G05D 1/0816; B64C 5/10; B64C 11/00; B64C 11/30; B64C 13/16; B64C 13/24; B64C 27/06; B64C 27/22; B64C 27/56
See application file for complete search history.

(56) References Cited

U.S. PATENT DOCUMENTS

| 8,052,094 B2 | 11/2011 | Roesch |
| 8,113,460 B2 | 2/2012 | Roesch |
| (Continued) | | |

FOREIGN PATENT DOCUMENTS

| FR | 2959205 A1 | 10/2011 |
| FR | 2990684 A1 | 11/2013 |
| (Continued) | | |

OTHER PUBLICATIONS

French Search Report for French Application No. FR2012979, Completed by the French Patent Office, dated Oct. 26, 2021, 8 pages.
(Continued)

*Primary Examiner* — Brian M O'Hara
(74) *Attorney, Agent, or Firm* — Brooks Kushman P.C.

(57) ABSTRACT

A method for controlling a hybrid helicopter having at least one lifting rotor, at least one forward-movement propeller and an empennage provided with at least one moveable empennage surface. The method includes the following steps: using a main sensor to determine a current value of a rotor parameter conditioning a current power drawn by the lifting rotor, using an estimator to determine a current setpoint of the rotor parameter, adjusting a position of the moveable empennage surface using a deflection controller as a function of the current value and of current setpoint.

21 Claims, 5 Drawing Sheets

(51) Int. Cl.
  *G05D 1/08* (2006.01)
  *B64C 5/10* (2006.01)
  *B64C 11/00* (2006.01)
  *B64C 11/30* (2006.01)
  *B64C 13/24* (2006.01)
  *B64C 27/06* (2006.01)
  *B64C 27/56* (2006.01)

(52) U.S. Cl.
  CPC .............. *B64C 13/16* (2013.01); *B64C 13/24* (2013.01); *B64C 27/06* (2013.01); *B64C 27/22* (2013.01); *B64C 27/56* (2013.01)

(56) References Cited

U.S. PATENT DOCUMENTS

| | | | |
|---|---|---|---|
| 8,170,728 | B2 | 5/2012 | Roesch |
| 8,181,901 | B2 * | 5/2012 | Roesch ................... B64C 27/26 244/6 |
| 8,186,629 | B2 | 5/2012 | Queiras et al. |
| 9,278,754 | B2 | 3/2016 | Sonneborn |
| 9,703,294 | B2 * | 7/2017 | Morel ................... G05D 1/0816 |
| 2012/0153072 | A1 | 6/2012 | Eglin et al. |
| 2014/0084105 | A1 | 3/2014 | Eglin |
| 2014/0084106 | A1 | 3/2014 | Eglin |
| 2020/0180755 | A1 * | 6/2020 | Prud'Homme Lacroix ................ B64C 27/52 |
| 2020/0307779 | A1 | 10/2020 | Ross et al. |

FOREIGN PATENT DOCUMENTS

| | | |
|---|---|---|
| RU | 2551703 C2 | 5/2015 |
| RU | 2551830 C2 | 5/2015 |

OTHER PUBLICATIONS

Russian Search Report for Application No. 2021135569/11, Completed by the Russian Patent Office, dated Apr. 19, 2022, 2 pages.

* cited by examiner

| V<V1 | V1≤V<V2 | V2≤V<V3 | V3≤V<V4 | V≥V4 |
|---|---|---|---|---|
| NA | $W_{rotor}*1$ | $W_{rotor}*2$ | $W_{rotor}*3$ | $W_{rotor}*4$ |

Fig.5

| | V<V1 | V1≤V<V2 | V2≤V<V3 | V3≤V<V4 | V≥V4 |
|---|---|---|---|---|---|
| dens 1 | NA | $W_{rotor}*1$ | $W_{rotor}*2$ | $W_{rotor}*3$ | $W_{rotor}*4$ |
| dens 2 | NA | $W_{rotor}*5$ | $W_{rotor}*6$ | $W_{rotor}*7$ | $W_{rotor}*8$ |
| dens 3 | NA | $W_{rotor}*9$ | $W_{rotor}*10$ | $W_{rotor}*11$ | $W_{rotor}*12$ |

METHOD FOR PILOTING A HYBRID HELICOPTER HAVING AN AIRFRAME MAINTAINED AT CONSTANT INCIDENCE BY REGULATING A POSITION OF AT LEAST ONE MOBILE TAIL UNIT SURFACE

CROSS-REFERENCE TO RELATED APPLICATION

This application claims priority to French Patent Application No. FR 20 12979 filed on Dec. 10, 2020, the disclosure of which is incorporated in its entirety by reference herein.

TECHNICAL FIELD

The present disclosure relates to a method for controlling a hybrid helicopter with an airframe held at a constant incidence by adjusting a position of at least one moveable empennage surface, as well as a hybrid helicopter implementing said method. The disclosure relates to the general technical domain of automatic or semi-automatic flight-control systems.

BACKGROUND

The project related to this disclosure has received financing from the European Union Horizon 2020 research and innovation program, as part of the CleanSky 2 No. GAM-FRC-2014-001 Issue E grant.

A rotary-wing aircraft is an aircraft provided with a rotary wing, more commonly referred to as a rotor. A rotary-wing aircraft conventionally has an airframe and at least one rotor driven in rotation by a drive unit. Such a rotor can be referred to as a "lifting rotor" as it helps to lift the aircraft. This rotor can also be used to move the aircraft forwards. A rotary-wing aircraft can also have one or more forward-movement propellers that participate at least partially in the forward movement of the rotary-wing aircraft. For the sake of simplicity, the term "propeller" is used hereinafter to refer to a propulsion or traction forward-movement propeller.

In particular, a rotary-wing aircraft, referred to as a "hybrid helicopter" for convenience, comprises an airframe, at least one rotor, an empennage, one or more forward-movement propellers that may be positioned beside the airframe, and possibly additional lifting means such as a wing.

This wing or airfoil can for example comprise two half-wings arranged on either side of the fuselage.

According to another aspect, the hybrid helicopter may have at least one engine. This engine or engines may be connected by a mechanical connection system to the propeller or propellers and to the rotor. The rotational speed of the output of the engine or engines, of the propeller or propellers, of the rotor, and of the mechanical connection system are for example proportional to one another, and the coefficient of proportionality is constant regardless of the flight configuration of the hybrid helicopter under normal operating conditions of the integrated kinematic linkage.

Consequently, the rotor is advantageously continuously driven in rotation by the engine or engines in the normal flight configurations.

To control the hybrid helicopter, a collective pitch component and a cyclic pitch component of the pitch of the rotor blades can be controlled. The helicopter can therefore have kinematic linkages including pitch control actuators. Such a pitch control actuator can for example be a servocontrol. The pitch control actuators are for example articulated to a set of swashplates linked by connecting rods to each blade of the main rotor. These kinematic linkages can include controls moveable by a human pilot and cylinders controlled by an automatic pilot.

Furthermore, the hybrid helicopter can include at least one kinematic linkage to control the pitch of the blades of the propeller or propellers in order to control the thrust generated by each propeller. The propeller or propellers can also act on the forward-movement speed or yawing of the hybrid helicopter.

Furthermore, the hybrid helicopter includes an empennage provided with lifting members. These lifting members can be moveable. Hereinafter, the term "moveable empennage surface" is used to refer to a member of an empennage that is used to act on the pitch equilibrium of the aircraft, notably at high speeds. Such a moveable empennage surface can be a horizontal or inclined empennage that is entirely movable in rotation, or a moveable flap that is articulated with a static surface of a horizontal or inclined empennage, or equivalent. The pitch of the hybrid helicopter can also be controlled by cyclically controlling the pitch of the blades of the main rotor, while at least one moveable empennage surface is being loaded to adjust the pitch equilibrium of the aircraft according to predetermined criteria.

Documents U.S. Pat. Nos. 8,181,901 B2, 8,170,728 B2, 8,052,094 B2 and 8,113,460 B2 describe hybrid helicopters.

Such a hybrid helicopter is particularly noteworthy in that it can reach high speeds and/or travel large distances. However, on account of the specificity thereof and the multiple controllable members, it can be difficult to control the propeller or propellers and/or the rotor during a stabilized flight phase to create optimum operating conditions for the aircraft without generating a significant workload for the pilot.

"Stabilized flight phase" means a flight at a substantially constant forward-movement speed, which may be high, during which the aircraft follows a constant trajectory while holding the cell at a constant incidence. The specific case in which the rate of climb is zero and the stabilized flight phase occurs at a constant altitude is referred to as cruise flight or level flight. A constant trajectory means a trajectory followed with no acceleration or change of direction by the aircraft.

Optimum operating conditions may be operating points to be reached by the propeller or propellers and by the rotor to minimize fuel consumption, to maximize loading of the propellers, or for other reasons.

Furthermore, the hybrid helicopter has to be piloted continuously to follow a constant trajectory at a constant incidence. Notably, the total lift generated by the lifting members of the hybrid helicopter have to be adjusted during the flight to adapt to variations in mass of the hybrid helicopter, for example caused by fuel consumption, and in the mass density of the air.

Document FR 2959205 describes a control and adjustment method with a pitch or attitude feedback loop, a speed feedback loop using an average pitch command of the blades of the propeller or propellers, and a feedback control loop of said deflection angle of the horizontal empennage. This feedback control loop includes the following steps: determining the initial power delivered by the drive unit following activation of the feedback control loop, commanding a first movement speed of a motorized empennage member, and comparing the new power delivered by the drive unit with the initial power. The subject matter of the patent is different from the subject matter of the disclosure in attempting to minimize the total power generated by the drive unit of the hybrid helicopter.

Document FR2990684 describes a method in which a collective pitch setpoint and a longitudinal cyclic pitch setpoint of the blades of a main rotor of a hybrid helicopter are determined such that the hybrid helicopter converges towards an optimized operating point of said main rotor during a stabilized flight phase, while retaining a target constant vertical hold, such as a vertical speed or a constant incidence, and a target constant longitudinal attitude corresponding to said stabilized flight phase.

According to document FR2990684, the lift exerted by a wing of the hybrid helicopter is adjusted by acting on aerodynamic means and applying a feedback loop to bring the collective pitch of the blades of the lifting rotor towards the collective pitch setpoint. The lift exerted by the wing is notably adjusted to take account of the variations in mass of the aircraft caused by fuel consumption.

According to document FR2990684, the lift exerted by a horizontal empennage is further adjusted by applying a feedback loop to bring the longitudinal cyclic pitch of the blades of the rotor towards the longitudinal cyclic pitch setpoint, in order to take account of centering variations. Alternatively, the adjustment can take account of a longitudinal bending moment of a pylon of said main rotor, hereinafter referred to as the "rotor pylon" and a longitudinal bending moment setpoint.

SUMMARY

The present disclosure is intended to propose a novel method for following a trajectory at substantially constant incidence with a hybrid helicopter by optimizing operation of the propeller or propellers and of the main rotor, referred to as the "lifting rotor", without overloading the pilot, for example to minimize fuel consumption or to maximize loading of the propeller or propellers.

The disclosure therefore relates to a method for controlling a hybrid helicopter, said hybrid helicopter having at least one lifting rotor provided with variable-pitch blades, said hybrid helicopter having at least one forward-movement propeller provided with blades, said hybrid helicopter having an empennage provided with at least one moveable empennage surface that is designed to at least generate a pitching moment on an airframe of the hybrid helicopter, said hybrid helicopter having at least one empennage actuator to move, for example in rotation, said at least one moveable empennage surface.

The method includes a stabilized flight phase comprising a rotor adjustment phase including a longitudinal attitude hold step and a rate-of-climb hold step, as well as a propeller adjustment phase including a forward-movement-speed hold step, the stabilized flight phase including an empennage adjustment phase including the following steps:
  determination, using a main sensor, of a current value of a rotor parameter conditioning a current power drawn by said lifting rotor,
  determination, using an estimator, of a current setpoint of said rotor parameter, which is static or a function of a value of at least one monitoring parameter, in which said rotor parameter is a power drawn by the lifting rotor and said current setpoint is a power setpoint, or said rotor parameter is an engine torque transmitted to the lifting rotor and said current setpoint is a torque setpoint,
  adjustment of a position of said moveable empennage surface using a deflection controller as a function of said current value and of said current setpoint.

In a novel manner, this method proposes setting a current setpoint of a rotor parameter that is static or a function of current flight conditions.

The rotor parameter is the image of the power drawn by the lifting rotor, unlike in methods setting pitch setpoints, for example. The current setpoint of the rotor parameter is for example set by testing and/or simulations, and is the image of the optimum power drawn by the lifting rotor, where applicable for the current flight conditions. For example, the current setpoint of the rotor parameter is the target value of the rotor parameter to minimize fuel consumption under current flight conditions.

During a given flight, the value of the current setpoint can therefore be static or change as a function of the value of the monitoring parameter or parameters, the monitoring parameter or parameters being different from the rotor parameter.

Furthermore, according to this method, the position of at least one moveable empennage surface, or several or all of the moveable empennage surfaces as applicable, is adjusted by the deflection controller so that the current value of the rotor parameter tends towards the related current setpoint. Where there are several moveable empennage surfaces, a deflection instruction issued for each moveable empennage surface can also have another objective, such as to help control banking of the hybrid helicopter or to compensate for any asymmetry. Changing the deflection of the moveable empennage surface or surfaces tends to generate a nose-up or nose-down pitching moment on the airframe.

The stabilized flight phase includes a longitudinal attitude hold step. Subsequently, during this longitudinal attitude hold step, the rotor disk described by the blades of the lifting rotor is inclined to re-establish pitch equilibrium following movement of the moveable empennage surface or surfaces.

Furthermore, the stabilized flight phase includes a rate-of-climb hold step of the aircraft that enables the gradient of the trajectory followed to be kept substantially constant.

The incidence of the airframe alpha, the pitch attitude angle theta of the hybrid helicopter and the gradient gamma of the trajectory are linked by the following equation: alpha=theta−gamma. Keeping the pitch attitude angle theta of the hybrid helicopter and the gradient gamma of the trajectory substantially constant therefore results in a constant incidence of the airframe.

Furthermore, the incidence of the rotor disk of the lifting rotor affects the power drawn by said lifting rotor. The incidence of the rotor disk can be determined from the incidence of the airframe and the flapping angles of the lifting rotor and the inclination of the rotor pylon. At a given incidence of the airframe, the cyclical modification of the pitch of the blades of the lifting rotor varies the incidence of the rotor disk, which makes it possible to move the current value of the rotor parameter towards the current setpoint established.

Furthermore, changing the incidence of the rotor disk changes the forward-movement speed of the aircraft. If the rotor disk is inclined towards the front of the aircraft, the contribution of the rotor disk to the forward-movement speed is greater. Conversely, if the rotor disk is inclined towards the rear of the aircraft, the contribution of the rotor disk to the forward-movement speed is lesser. Consequently, during the forward-movement-speed hold step, the propeller or propellers are controlled automatically to keep this forward-movement speed substantially constant.

Furthermore, the method proposes controlling the position of the moveable empennage surface or surfaces as a function of a difference between a current setpoint and a current value of a rotor parameter such as drawn power or engine torque transmitted to the lifting rotor. Controlling the moveable empennage surface or surfaces can cause the current value to converge towards the current setpoint automatically by changing the pitch of the blades of the lifting rotor to keep the incidence of the airframe constant at a constant gradient. This causes a change in the pitch of the blades and/or rotational speed of the propellers to keep the forward-movement speed substantially constant. The lifting rotor and the propeller or propellers then operate at a predetermined operating point of the aircraft that is deemed optimal.

Using a rotor parameter such as power drawn by the lifting rotor or engine torque transmitted to the lifting rotor has the advantage of using a rotor parameter that can be determined relatively easily and reliably during flight. The term "reliable" means that the rotor parameter used can be determined using sensors that can be redundant and/or that can undergo consistency tests or be merged. The current value of the rotor parameter can therefore be used in an automatic control method of the hybrid helicopter without compromising the safety of the flight as a result of approximate measurements.

Furthermore, the power drawn by the lifting rotor is adjusted by adjusting the pitch attitude angle of the hybrid helicopter, which can be done by measuring, also precisely and reliably, the current pitch attitude angle, for example with an inertial measurement unit.

Furthermore, this method is relatively simple and requires the use of resources that may already be present on a hybrid helicopter.

Furthermore, the relationship between the power drawn by the lifting rotor or the engine torque transmitted to the lifting rotor on one hand and the position of the moveable empennage surface or surfaces on the other is monotonic, i.e., always increasing or decreasing. Consequently, convergence of the adjustment towards an optimal value is guaranteed.

Finally, this method is not sensitive to centering variations of the hybrid helicopter that could for example occur during flight as a result of fuel consumption or cargo drops. Variations in this centering cause a change in the pitch equilibrium of the hybrid helicopter that automatically generates a new setting, and for example a cyclic adjustment of the pitch of the blades of the lifting rotor.

This method may have one or more of the following features.

According to one feature, said adjustment of a position of said moveable empennage surface may include the following steps:
  determination of a deflection instruction for said moveable empennage surface using the deflection controller as a function of said current value and of said current setpoint,
  deflection of said moveable empennage surface using said empennage actuator as a function of said deflection instruction.

According to a feature compatible with the preceding feature, the deflection controller can be a proportional-integral-derivative controller, for example a function of a value equal to the current value less said current setpoint or vice versa.

Such a deflection controller can enable the current value to tend towards or reach the current setpoint reliably and according to a dynamic that does not conflict with the longitudinal attitude hold, i.e., pitching.

According to a feature compatible with the preceding features, the current setpoint can be variable and established as a function of one or more monitoring parameters, in which the monitoring parameter or parameters can be of the following types.

Thus, said at least one monitoring parameter can be a forward-movement speed of the hybrid helicopter.

Said at least one monitoring parameter may be the lift generated by the lifting rotor.

Said at least one monitoring parameter may be a rotational speed of said lifting rotor.

Said at least one monitoring parameter may be an altitude or height of the hybrid helicopter.

Said at least one monitoring parameter may be a temperature of the air outside said hybrid helicopter.

Said at least one monitoring parameter may be a deflection angle of a flap of said wing in relation to a reference.

Said at least one monitoring parameter can be a value representing the current mass of the hybrid helicopter, which can be estimated for example using the mass on take-off and fuel consumption, supplemented by information entered by the pilot during the flight.

In one example, the current setpoint can be established using tabulated values predetermined using tests, calculations and/or simulations and that are a function of one or more of the preceding monitoring parameters.

In another example, the current setpoint can be established using a polynomial memorized using tests, calculations and/or simulations and that is a function of one or more of the preceding monitoring parameters.

According to a feature compatible with the preceding features, said method may include a suspension phase of the stabilized flight phase if at least one of the following conditions is met:
  a pilot exerts a force on a cyclic-pitch control cyclically controlling the pitch of the blades of the lifting rotor, for example a force greater than a first force threshold,
  a pilot exerts a force on a collective-pitch control collectively controlling the pitch of the blades of the lifting rotor, for example a force greater than a second force threshold,
  a component along the earth vertical of a load factor of the hybrid helicopter is greater in absolute terms than a given load factor threshold,
  a bank angle of said airframe is greater in absolute terms than a given bank threshold.

This feature tends to prevent the method from disturbing the control of the hybrid helicopter by a human pilot. For example, if the pilot operates a collective or cyclic-pitch control, the method is inhibited, possibly momentarily and for as long as this condition exists. For example, either the deflection instruction is not calculated or transmitted, or said deflection instruction is not taken into account.

According to a feature compatible with the preceding features, the method can include the following steps: measurement of a measured forward-movement speed of said hybrid helicopter and comparison of the measured forward-movement speed with a predetermined speed threshold, said stabilized flight phase being implemented when said measured forward-movement speed is equal to or greater than the speed threshold.

The moveable empennage surface or surfaces may only be able to generate enough pitching moment to change the pitch of the blades of the lifting rotor at a sufficiently high forward-movement speed. Consequently, the deflection of said moveable empennage surface may be adjusted only when the measured forward-movement speed is equal to or greater than an activation threshold. For example, the activation threshold is in the order of 150 knots or substantially 277 kilometers per hour.

The method may include a step of deflecting said moveable empennage surface using said at least one empennage actuator to a safe deflection angle memorized when said measured forward-movement speed is less than the speed threshold.

For example, below the activation threshold, the moveable empennage surface or surfaces are deflected to a predetermined angle, for example to a zero-degree angle (0°) in relation to a reference.

According to a feature compatible with the preceding features, said longitudinal attitude hold step may include the adjustment of a pitch attitude angle of said airframe as a function of a reference angle by adjusting a cyclic component of said pitch of the blades of the lifting rotor.

Such a longitudinal attitude hold step may be carried out conventionally using a plurality of cylinders that are designed to control a plurality of servocontrols cyclically controlling the pitch of the blades of the lifting rotor.

The reference angle may be an angle set by a pilot using a human-machine interface, or the pitch attitude angle of said airframe reached on initiation of the stabilized flight phase, or where applicable following the aforementioned suspension for example.

Said rate-of-climb hold step may include adjustment of a rate of climb of the hybrid helicopter in relation to a reference vertical speed by modification of a collective component of the pitch of the blades of the lifting rotor.

The reference vertical speed may be a speed set by a pilot using a human-machine interface, or the rate of climb reached on initiation of the stabilized flight phase, or where applicable following the aforementioned suspension for example.

The dynamic of said empennage adjustment phase may be slower than a dynamic of said rotor adjustment phase.

Consequently, there is no risk of the empennage adjustment phase conflicting with or interfering with the rotor adjustment phase.

According to a feature compatible with the preceding features, said forward-movement-speed hold step may include the adjustment of a forward-movement speed of said hybrid helicopter as a function of a reference forward-movement speed by controlling at least said pitch of the blades or a rotational speed of said at least one forward-movement propeller.

The expression "controlling at least said pitch of the blades or a rotational speed of said at least one forward-movement propeller" means that the pitch of the blades and/or the rotational speed of at least one propeller are controlled, for example using known methods.

The reference forward-movement speed may be a speed set by a pilot using a human-machine interface, or the forward-movement speed reached on initiation of the stabilized flight phase, or where applicable following the aforementioned suspension for example.

The disclosure also relates to a hybrid helicopter, said hybrid helicopter having at least one lifting rotor provided with variable-pitch blades, said hybrid helicopter having at least one forward-movement propeller provided with blades, said hybrid helicopter having an empennage provided with at least one moveable empennage surface that is designed to at least generate a pitching moment on an airframe of the hybrid helicopter, said hybrid helicopter having at least one empennage actuator to move, for example in rotation, said at least one moveable empennage surface.

This hybrid helicopter has a system for following a trajectory at constant incidence that is designed to implement the method according to the disclosure, the system for following a trajectory at constant incidence including:
  a main sensor designed to measure said current value,
  at least one measurement system designed to determine said value of at least one monitoring parameter,
  an estimator designed to determine said current setpoint,
  a deflection controller designed to adjust said position of said moveable empennage surface as a function of said current value and of said current setpoint, the deflection controller being in communication with said empennage actuator.

If there is a static current setpoint, the estimator may for example be a simple memory.

If there is a current setpoint that is variable as a function of a value of at least one monitoring parameter, the estimator may be a computer or a function included in an existing processor. The controller may also notably adjust the position of said moveable empennage surface as a function of the speed of the machine, altitude, pressure and/or temperature via the current setpoint.

The term "sensor" should be understood in the broad sense and to refer to equipment or systems emitting for example an electrical or optical signal carrying the desired information. A sensor may for example emit an electrical signal having a voltage that varies as a function of the value of said information. The term "sensor" may refer to one or more sensors cooperating together, or an array including at least one sensor and at least one analyzer emitting a measurement signal.

Furthermore, said at least one measurement system may include at least one of the following members: a forward-movement speed sensor of the hybrid helicopter, a lift sensor generating an image signal of the lift generated by the lifting rotor, a rotational speed sensor generating an image signal of a rotational speed of said lifting rotor, an altitude or height sensor of the hybrid helicopter, a temperature sensor of the air outside said hybrid helicopter, an angle sensor measuring a deflection angle of a flap of said wing in relation to a reference, a deflection sensor measuring a deflection angle of said moveable empennage surface.

The hybrid helicopter may include at least one of the following members: a cyclic control force sensor generating a signal that varies when a pilot exerts a force on a cyclic-pitch control cyclically controlling the pitch of the blades of the lifting rotor, a collective control force sensor generating a signal that varies when a pilot exerts a force on a collective-pitch control collectively controlling the pitch of the blades of the lifting rotor, a load factor sensor generating a signal that varies as a function of a component along the earth vertical of a load factor of the hybrid helicopter, and a bank angle sensor.

According to one possibility that is compatible with the preceding possibilities, said hybrid helicopter may include a system for adjusting an attitude angle of said airframe as a function of a reference angle and a system for adjusting a rate of climb of the hybrid helicopter in relation to a reference vertical speed, each of which is designed to act on at least one cylinder linked to at least three servocontrols for adjusting the pitch of the blades of the lifting rotor. The hybrid helicopter may include a system for adjusting a forward-movement speed of the hybrid helicopter in relation to a reference forward-movement speed, in which this adjustment system may be designed to act on the pitch of the blades of the propeller or propellers and/or on the rotational speed of the propeller or propellers.

BRIEF DESCRIPTION OF THE DRAWINGS

The disclosure and the advantages thereof are explained in greater detail in the following description, with examples given for illustrative purposes and with reference to the attached figures, which show:

FIG. 2, a diagram showing a system for following a trajectory at constant incidence, FIG. 3, a diagram showing the method according to the disclosure, FIG. 4, a table showing an example determination of a current setpoint of said rotor parameter, FIG. 5, a table showing an example determination of a current setpoint of said rotor parameter, FIG. 6, a diagram showing the deflection of a moveable empennage surface according to a nose-up deflection instruction, and FIG. 7, a diagram showing the deflection of a moveable empennage surface according to a nose-down deflection instruction.

DETAILED DESCRIPTION

In the present application, the expression "hybrid helicopter" therefore refers to a rotary-wing aircraft fitted with at least one propulsion or traction forward-movement propeller. Unless otherwise specified explicitly or implicitly, the terms "rotor" or "main rotor" or "lifting rotor" refer to a rotary wing of the rotary-wing aircraft. Unless otherwise specified explicitly or implicitly, structurally and functionally identical elements appearing in different figures are indicated using the same reference sign.

Figure 1:
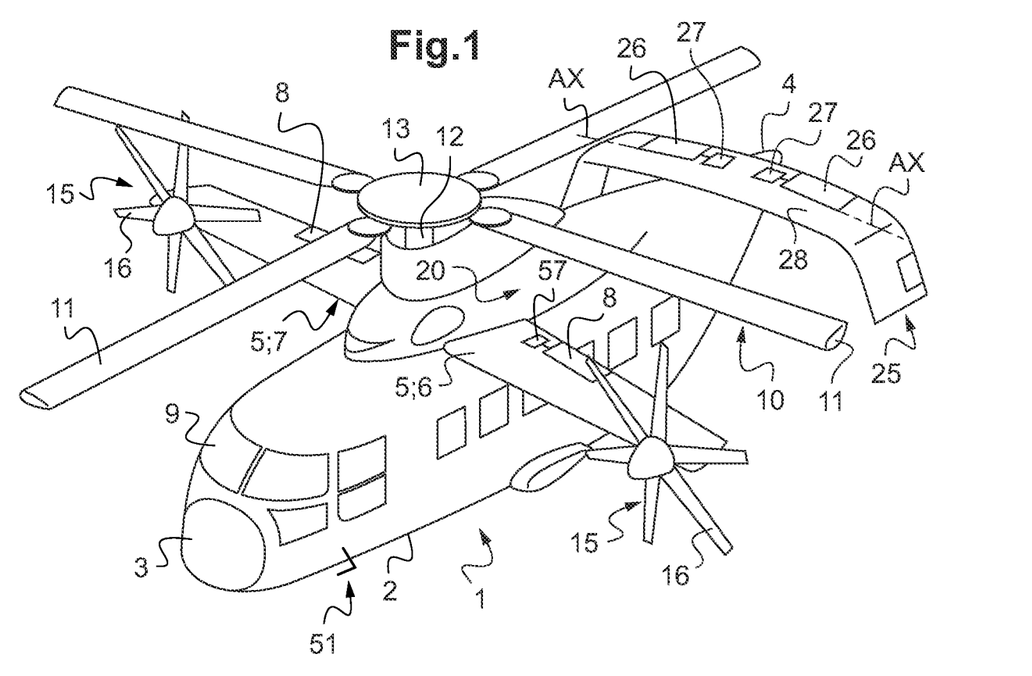
FIG. 1, a view of a hybrid helicopter according to the disclosure.

FIG. 1 shows an example hybrid helicopter 1 according to the disclosure.

In all embodiments, the hybrid helicopter 1 includes an airframe 2 that extends along a longitudinal axis from back to front, from a tail 4 to a nose 3. The hybrid helicopter 1 may have a cockpit 7 at the front of the airframe 2.

In all embodiments, the hybrid helicopter 1 has at least one lifting rotor 10. The lifting rotor 10 has a plurality of blades 11 rotated by a rotor pylon 12, for example via a rotor hub 13.

In all embodiments and with reference to FIG. 1, the hybrid helicopter 1 has at least one propeller 15 fitted with blades 16. The blades 16 can have a variable pitch and/or a variable rotational speed. For example, at least two propellers 15 are arranged on either side of the airframe 2, transversely across the aforementioned longitudinal axis.

Figure 2:
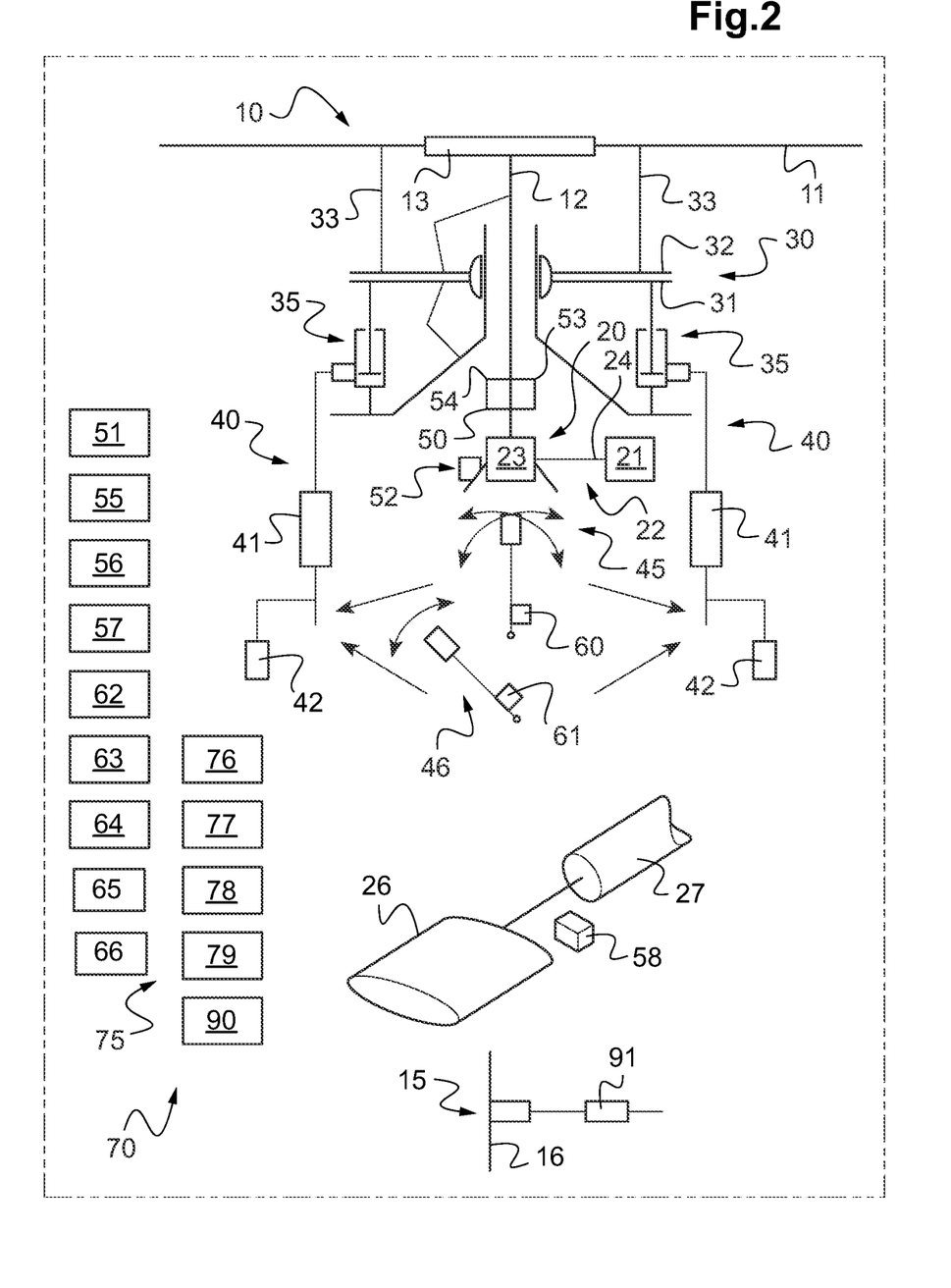

To rotate the rotor pylon 12 and the propeller or propellers 15, the hybrid helicopter 1 has a drive unit 20 shown schematically in FIG. 2. This drive unit 20 is provided with at least one engine 21, and for example at least one turboshaft engine. Furthermore, the drive unit 20 can include a mechanical connection system 22 kinematically linking the engine or engines 21 to the rotor pylon 12 or to the propeller or propellers 15. At least one propeller can alternatively be moved by its own motor or its own drive chain, for example. Such a mechanical connection system 22 may include at least one main transmission gearbox 23 and at least one shaft 24.

The rotational speed of the output of the engine or engines 21, of the propeller or propellers 15, of the lifting rotor 10, and of the mechanical connection system 22 are for example proportional to one another, and the coefficient of proportionality may be constant regardless of the flight configuration of the hybrid helicopter 1 under normal operating conditions of the integrated kinematic linkage.

In all embodiments and with reference to FIG. 1, the hybrid helicopter 1 can have at least one wing 5 or another airfoil, and for example a high wing 5 as in the example shown. This wing 5 has two half-wings 6, 7 arranged respectively to the left and right of the airframe 2 as seen by an observer facing the direction of forward movement of the hybrid helicopter 1. For example, each propeller 15 is carried by a half-wing 6, 7. Thus, according to the example in FIG. 1, the hybrid helicopter 1 has two propellers 15 carried respectively by two half-wings 6, 7 arranged to the left and right of the airframe 2 as seen by said observer.

According to another example (not shown), one or more of the propellers may be carried laterally by one or more arm or the like, or may be arranged differently.

In all embodiments and with reference to FIG. 1, the hybrid helicopter 1 has an empennage 25 provided with stabilizing and control surfaces. In particular, the empennage 25 has at least one moveable empennage surface 26 that is designed to generate at least a pitching moment on the airframe 2. Such a moveable empennage surface 26 can be a flap or an elevator aileron articulated with a static plane 28 or an empennage that is movable as a whole. In order to control the position and for example the deflection angle of at least one moveable empennage surface 26 in relation to a reference, the hybrid helicopter 1 may have a least one empennage actuator 27. For example, such an empennage actuator 27 has a rotary motor or the like that is designed to cause at least the rotation of one or more moveable empennage surfaces 26 in relation to one or more axes AX.

The stabilizing and control surfaces can also have static and/or moveable yaw stabilizing surfaces. The empennage 25 can take a range of forms, for example an inverted "U" as shown in FIG. 1.

Regardless of these aspects and with reference to FIG. 2, the blades 11 of the lifting rotor 10 are variable-pitch blades controllable collectively and cyclically.

According to an example provided to illustrate the disclosure, the hybrid helicopter 1 has a plurality of kinematic linkages 40 for example linking a collective-pitch control 46 and a cyclic-pitch control 45 to at least three servocontrols 35. Each kinematic linkage 40 must be controllable using one or more actuators, for example using a serial cylinder 41 and/or a parallel cylinder 42, and these linkages need not be completely independent. Each servocontrol 35 may be articulated with a non-rotary plate 31 of a swashplate assembly 30. Consequently, a rotary plate 32 of the swashplate assembly 30 is linked to the blades 11 of the lifting rotor 10 by respective pitch connecting rods. Aa movement of the collective-pitch control 46 then causes an identical modification in the length of each servocontrol 35, which enables the pitch of the blades 11 of the lifting rotor 10 to be modified collectively and identically. A movement of the cyclic-pitch control 45 causes a modification of the length of at least one servocontrol 35 that is different from the modification of the length of at least one other servocontrol 35, which enables the pitch of the blades 11 of the lifting rotor 10 to be modified cyclically along the azimuth thereof.

According to another aspect, the pitch of the blades 16 of the propeller or propellers 15 may be controlled by at least one kinematic propeller linkage including at least one actuator 91, not shown in FIG. 1. Complementarily or alternatively, the rotational speed of the propeller or propellers 15 may be controlled by an actuator 91, for example a variable-speed motor actuator 91 moving a propeller.

In all embodiments, the hybrid helicopter 1 has a system 70 for following a trajectory at constant incidence that is designed to implement the method according to the disclosure described below.

This system 70 has a main sensor 50 for measuring the current value of a rotor parameter.

This rotor parameter can be a power drawn by the lifting rotor 10 or an engine torque transmitted to the lifting rotor, and for example a torque exerted on the rotor pylon 12. In general, the different on-board avionics systems make it possible to measure and/or calculate the values of the rotor parameters used in the context of the present disclosure, as listed below. These rotor parameters can be conventional and therefore the main sensor does not need to be described in detail.

However, if the rotor parameter is the power drawn by the lifting rotor 10, the main sensor 50 may for example be an angular rate sensor 53 and a torque meter 54 for directly or indirectly measuring the rotational speed of the rotor pylon 12 and a torque exerted on this rotor pylon 12 respectively, as well as a multiplier multiplying said rotational speed of the rotor pylon 12 and said torque. A main sensor determining the power drawn by the lifting rotor can also be a system comprising an engine sensor determining a power generated by the drive unit and a propeller sensor determining the power drawn by the propeller or propellers, the power drawn by the lifting rotor 10 for example being considered to be the difference between the power generated by the drive unit and the power drawn by the propeller or propellers, less installation losses.

If the rotor parameter is the engine torque transmitted to the lifting rotor, the main sensor 50 can for example be the torque meter 54 only. Alternatively, a torque meter arranged upstream of the rotor pylon on a member that is movable in rotation jointly with the rotor pylon can be used, potentially applying a coefficient of proportionality.

Furthermore, the system 70 can have at least one measurement system that is designed to determine the value of at least one monitoring parameter, for example at least one of the following members:

a forward-movement speed sensor 51 measuring a forward-movement speed of the hybrid helicopter 1, such as a pitot tube sensor or a satellite positioning system, a lift sensor 52 generating an image signal of a lift generated by the lifting rotor 10, such as a system measuring the forces on the bars of a main transmission gearbox driving the rotor pylon, as described in the literature, a rotational speed sensor 53 generating an image signal of a rotational speed of said lifting rotor 10, an altitude or height sensor 55 of the hybrid helicopter 1, such as a barometric system or a radiosonde or a satellite positioning system, or a radar system or equivalent, an air temperature sensor 56 positioned on the outside of said hybrid helicopter 1, such as a thermometer or equivalent, an angle sensor 57 measuring a deflection angle of a flap 8 of a wing 5 in relation to a reference, a deflection sensor 58 measuring a deflection angle of at least one moveable empennage surface.

The system 70 may include at least one of the following measurement members:

a cyclic control force sensor 60 generating a signal that varies when the pilot exerts a force on the cyclic-pitch control 45 cyclically controlling the pitch of the blades 11 of the lifting rotor 10, a collective control force sensor 61 generating a signal that varies when the pilot exerts a force on the collective-pitch control 46 collectively controlling the pitch of the blades 11 of the lifting rotor 10, a load factor sensor 62 generating a signal that varies as a function of a component Nz along the earth vertical of a load factor of the hybrid helicopter 1, such a sensor 62 potentially being part of an attitude and heading reference system (AHRS), a bank angle sensor 63 measuring a bank angle of the hybrid helicopter 1, such a sensor 63 potentially being a turning and banking indicator or part of an inertial measurement unit, a pitch angle sensor 64 measuring a pitch angle of the hybrid helicopter 1, such a sensor 64 potentially being a turning and banking indicator or part of an inertial measurement unit, a sensor 65 generating a signal that varies as a function of the variation of a rate of climb VZ of the hybrid helicopter, for example using a vertical speed indicator, a current mass sensor 66 of the hybrid helicopter, which may include a fuel gauge to estimate the fuel in the aircraft, in which the sensor 66 may have a human-machine interface to memorize the mass of the aircraft on takeoff, or other information, enabling a computer of the sensor 66 or the like to determine the mass of the aircraft using conventional methods.

Furthermore, the system 70 may include a processing unit, referred to for convenience as the "computer 75", implementing the method using the signal or signals sent by one or more of the aforementioned sensors to control the empennage actuator or actuators 27 and the cylinders 41, 42 used to act on the pitch of the blades 11 of the lifting rotor 10.

The computer 75 may for example include at least one processor and at least one memory, at least one integrated circuit, at least one programmable system, and at least one logic circuit. These examples do not limit the scope of the term "computer". The term "processor" may also refer to a central processing unit (CPU), a graphical processing unit (GPU), a digital signal processor (DSP), and a microcontroller, inter alia.

The computer 75 may include several modules, which may include independent units or lines of code, for example. Each module may include at least one processor and/or at least one memory, at least one integrated circuit, at least one programmable system, and at least one logic circuit. These examples do not limit the scope of the term "module". The computer may be a computer of an aircraft flight control system (AFCS).

Thus, the computer 75 can include a module referred to as the "estimator 76" that is designed to determine a current setpoint and a module referred to as the "deflection controller 77" that is designed to determine a deflection instruction and to send said instruction to the empennage actuator or actuators 27. In the context of a static current setpoint, the estimator 76 may simply be a memory and may take the form of a segment of code, for example in the context of a variable setpoint.

Regardless of these aspects, the computer 75 may include a system 78 for adjusting an attitude angle of said airframe 2 as a function of a reference angle and/or a system 79 for adjusting a rate of climb VZ of the hybrid helicopter 1 that communicate with the aforementioned cylinders 41, 42 to control the servocontrols 35. The system 78 is therefore an attitude angle controller and the system 79 is a rate-of-climb controller.

The computer 75 may include a system 90 for adjusting a forward-movement speed VA of said hybrid helicopter 1 as a function of a reference forward-movement speed VA*, which communicates for example with at least one actuator 91 acting in the same manner on the pitch of the blades 16 of each propeller or on the rotational speed of each propeller.

Figure 3:
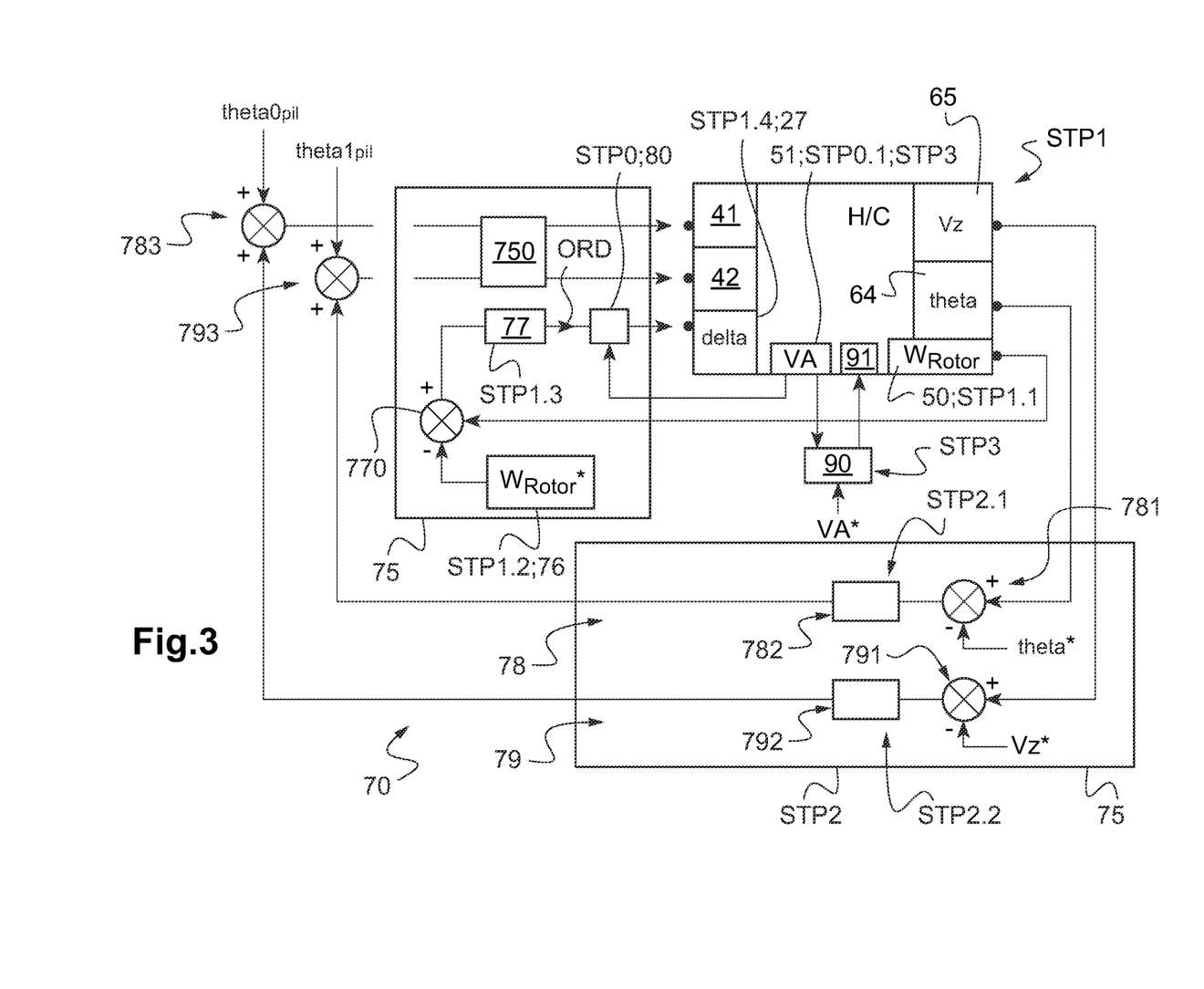

FIG. 3 shows the method according to the disclosure.

This method includes a stabilized flight phase STP1 that includes an empennage adjustment phase STP1 for adjusting the position, and for example a deflection angle in relation to a reference, of the moveable empennage surface or surfaces 26.

This empennage adjustment phase STP1 includes a determination step STP1.1 for determining the current value of the rotor parameter using the main sensor 50. In particular, the main sensor 50 can emit an electrical or optical signal carrying said current value of the rotor parameter.

Before, during or after, the method includes a determination step STP1.2 for determining, using the estimator 76, a current setpoint to be reached by this rotor parameter. The current setpoint can either be static and for example memorized, or set by the estimator 76 as a function of a value of at least one monitoring parameter measured using the appropriate sensor.

Where a current setpoint is variable as a function of a value of at least one monitoring parameter, the estimator 76 can implement a predetermined stage, linear or polynomial variation law for example. In one possibility, the estimator 76 can apply a law obtained using interpolation methods from one or more values of one or more monitoring parameters. Several examples of an estimator 76 determining the current setpoint as a function of flight conditions are given below.

Figure 4:
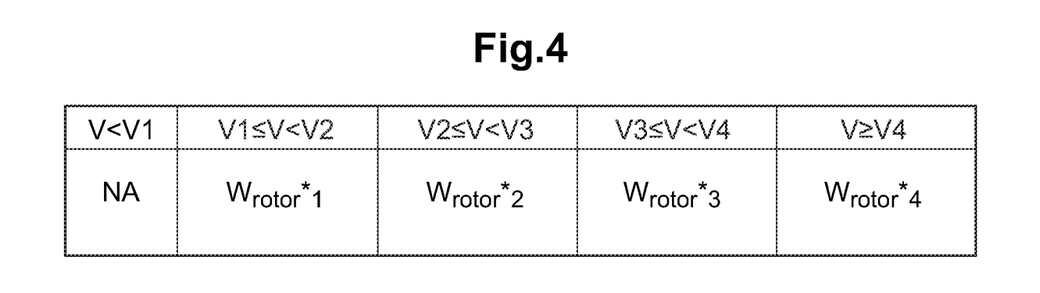

In a first example shown in FIG. 4, the estimator 76 memorizes tabulated values of the rotor parameter as a function of the forward-movement speed of the hybrid helicopter 1 measured using the forward-movement speed sensor 51. Thus, the rotor parameter takes a first memorized value Wrotor*1 when the current forward-movement speed is within a range between a first speed V1 inclusive and a second speed V2 greater than the first speed V1, a second memorized value Wrotor*2 when the current forward-movement speed is within a range from the second speed V2 inclusive to a third speed V3 greater than the second speed V2, a third memorized value Wrotor*3 when the current forward-movement speed is within a range from the third speed V3 inclusive to a fourth speed V4 greater than the third speed V3, then a fourth memorized value Wrotor*4 when the current forward-movement speed is equal to or greater than the fourth speed V4.

Figure 5:
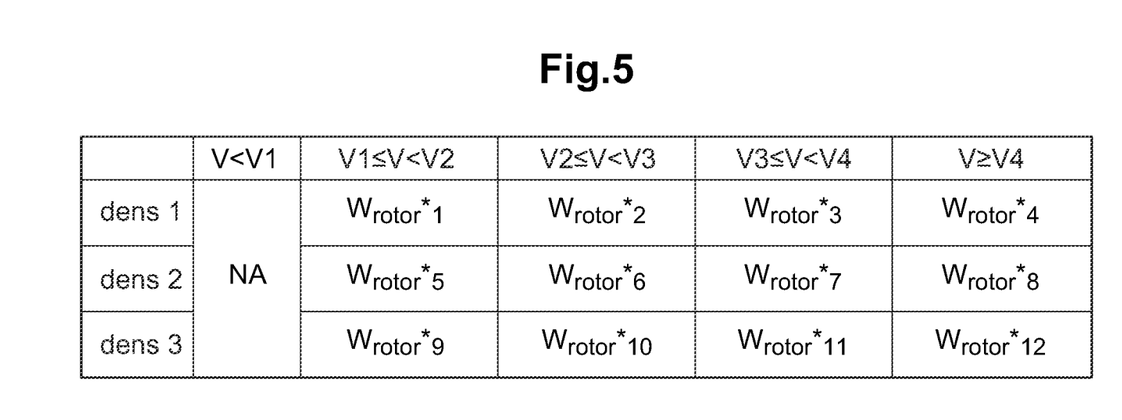

In a second example shown in FIG. 5, the estimator 76 memorizes tabulated values of the rotor parameter as a function of the forward-movement speed of the hybrid helicopter 1 and of the air density dens1, dens2, dens3.

The current density can be estimated conventionally using information provided by the altitude or height sensor 55 of the hybrid helicopter 1 and the temperature sensor 56.

According to the variant, more complex tables using values for other monitoring parameters can be used, such as the lift of the lifting rotor 10 determined using the lift sensor 52 or the deflection angle of at least one flap of the wing 5 measured using the deflection sensor 58.

According to a third example, the estimator 76 memorizes a polynomial. The variables of this polynomial are for example forward-movement speed VA, as well as air density and rotational speed of the lifting rotor 10 measured using the rotational speed sensor 54 and a deflection angle of a flap 8 of the wing measured using the angle sensor 57.

Regardless of the implementation method and with reference to FIG. 3, the estimator 76 memorizes the value of the current setpoint or for example applies at least one line of code to determine, at each calculation step, the current setpoint to be reached by the rotor parameter.

Consequently, the empennage adjustment phase STP1 illustrated includes adjustment of the position of the moveable empennage surface or surfaces 26. For example, this phase includes a determination step STP1.3 for determining a deflection instruction for the moveable empennage surface or surfaces 26 using the deflection controller 77 as a function of the current value and of the current setpoint of the rotor parameter.

For example, a subtracter 770 establishes a difference between the current value and the current setpoint of the rotor parameter and feeds said difference into the deflection controller 77. The deflection controller 77 may be a proportional-integral-derivative controller based on the difference between said current value and said current setpoint. Thus, the deflection instruction ord may be equal to the result of the following equation:

$$kp*(Wrotor-Wrotor*)+ki*\text{int}(Wrotor-Wrotor*)+kd*d(Wrotor-Wrotor*)/dt$$

where "kp", "ki" and "kd" are gains that can be determined by testing, calculation and/or simulation, "Wrotor" is the current value, "Wrotor*" is the current setpoint, "int" is an integral with respect to time, "d/dt" is a derivative with respect to time, "/" is the division sign, "*" is the multiplication sign, "+" is the addition sign, and "−" is the subtraction sign.

The empennage adjustment phase STP1 then includes a deflection phase STP1.4 for the moveable empennage surface or surfaces 26 using the empennage actuator or actuators 27 according to said deflection instruction. For example, the deflection controller 77 sends a signal carrying said deflection instruction, the empennage actuator or actuators 77 receive this signal and tilt the moveable empennage surface or surfaces 26 accordingly until the deflection angle delta measured by the deflection sensor 58 matches the target deflection angle. For example, the target deflection angle is the angle to which the moveable empennage surface or surfaces 26 should be tilted.

Furthermore, where there are several moveable empennage surfaces 26, a differential deflection maybe applied using another feedback loop or by addition, to respond to additional objectives such as compensating the asymmetry of a slipstream interfering with the empennage or assisted control of the banking of the hybrid helicopter 1.

According to one option, said method includes a suspension phase STP0 of the stabilized flight phase STP1 if at least one of the following conditions is met:
- a pilot exerts a force detected by the control force sensor 60 on the cyclic-pitch control 45,
- a pilot exerts a force detected by the control force sensor 61 on the collective-pitch control 46,
- a component Nz along the earth vertical of a load factor, measured using the load factor sensor 62, is greater in absolute terms than a load factor threshold memorized in an inhibitor 80, a bank angle of the airframe 2, measured using the bank angle sensor 63, is greater in absolute terms than a bank threshold memorized in the inhibitor 80.

Such an inhibitor 80 can for example be a module of the computer 75 of the system 70 that sends or does not send the deflection instruction to the empennage actuator or actuators 27 as a function of the aforementioned conditions. According to another example, the inhibitor may be a complementary module outside the computer 75 that can be interposed between the computer and 75 and the empennage actuators 27 to perform the same function.

The inhibitor 80 may alternatively inhibit the entire stabilized flight phase STP1.

According to one option, where applicable compatible with the preceding option, the method may include a measurement step STP0.1 for measuring a measured forward-movement speed VA of the hybrid helicopter 1 using the sensor 51.

A module of the system, for example the inhibitor 80, may then compare the measured forward-movement speed VA to a memorized speed threshold. In this context, the stabilized flight phase STP1 may be implemented only when the measured forward-movement speed VA is equal to or greater than the speed threshold.

Otherwise, the inhibitor 80 or another module may send an order to the empennage actuator or actuators 27 to deflect the moveable empennage surface or surfaces 26 to a memorized safe deflection angle.

According to an option that is compatible with the proceeding options, the method includes a rotor adjustment phase STP2 including a longitudinal attitude hold step STP2.1. This longitudinal attitude hold step STP2.1 may include the adjustment of a pitch attitude angle theta of said airframe 2, as a function of a reference angle theta* and of a current attitude angle theta measured by the sensor 64. A subtracter 781 establishes a difference between the reference angle theta* and the current attitude angle theta. An attitude controller 782 establishes an error signal, for example using a proportional-integral-derivative controller, as a function of this difference, then feeds said signal into a summer 783, which adds this error signal to a control signal theta0pil that varies as a function of the position of the cyclic-pitch control. The summer 783 then sends a setpoint signal to a control module 750, for example of the computer 75, to obtain a cyclic modification of said pitch of the blades 11 of the lifting rotor 10.

The adjustment phase of the rotor STP2 may include a rate-of-climb hold step STP 2.2. This rate-of-climb hold step STP 2.2 may include the adjustment of a rate of climb VZ of the hybrid helicopter 1, in relation to a reference vertical speed VZ* and a rate of climb VZ measured by the sensor 65. A subtracter 791 establishes a difference between the reference vertical speed VZ* and the rate of climb VZ. A vertical speed controller 792 establishes an error signal, for example using a proportional-integral-derivative controller, as a function of this difference, then feeds said signal into a summer 793, which adds this error signal to a control signal theta1pil that varies as a function of the position of the collective-pitch control. The summer 793 then sends a setpoint signal to the control module 750 to obtain a collective modification of the pitch of the blades 11 of the lifting rotor 10.

The reference vertical speed VZ* and the reference angle theta* may for example be equal to the rate of climb VZ and to the deflection angle theta reached at the time the method is started.

Furthermore, the stabilized flight phase may include a forward-movement-speed hold step STP3. This forward-movement-speed hold step STP3 may include the adjustment of the forward-movement speed VA measured using the forward-movement speed sensor 51 as a function of a reference forward-movement speed VA* by automatic control of the pitch of the blades 16 and/or of the rotational speed of each forward-movement propeller 15.

For example, the adjustment system 90 includes a subtracter that establishes a difference between the reference forward-movement speed VA* and the measured forward-movement speed VA. A speed controller of the system 90 establishes an error signal, for example using a proportional-integral-derivative controller, as a function of this difference, then feeds said signal into a summer, which adds this error signal to a control signal that varies as a function of a thrust control. The summer then sends a setpoint signal to each actuator 91 to obtain a collective modification of the pitch of the blades and/or of the rotational speed of the propeller or propellers.

The reference forward-movement speed VA* can for example be equal to the forward-movement speed reached at the time the method is started, a speed set using a human-machine interface, or where applicable following a suspension of the method.

Figure 6:
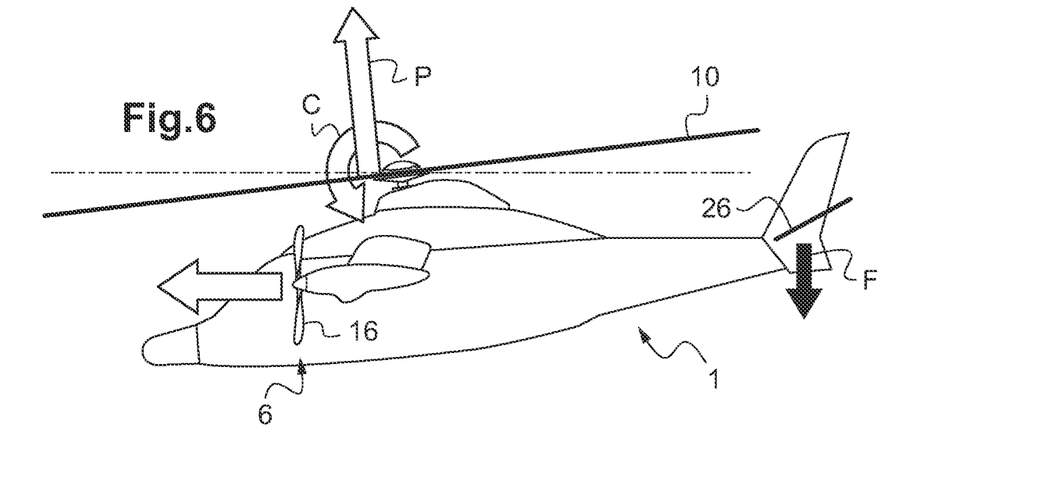

With reference to FIG. 6, the deflection instruction given can therefore tend to move the moveable empennage surface or surfaces 26 towards a position in which said surfaces generate a lift F that generates a nose-up pitching moment on the airframe 2. To keep a constant attitude and a constant trajectory in order to maintain a constant incidence, these setting then result, via the longitudinal attitude hold step STP2.1, in a cyclic nose-down command being sent to incline the rotor disk to counter the action of the empennage 25 on the airframe 2, or an action on the collective pitch of the blades of the lifting rotor 10 to follow the target trajectory. The lifting rotor 10 is then in propulsion mode in this example, a component of the aerodynamic force P thereof being used to propel the hybrid helicopter 1. The power drawn by the main rotor 10 is therefore increased. To keep the forward-movement speed substantially constant, the propellers 6 are then conversely unloaded. The pitch of the blades 16 and/or the rotational speed of the propellers 6 are reduced during the forward-movement-speed hold step. The power drawn by these propellers 6 is therefore reduced. The change in the lift of the rotor that is caused by a change in inclination of the rotor disk is countered by the rate-of-climb hold step, which causes a modification of the collective pitch. The trajectory then remains constant and consequently the angle of incidence and the lift of the wing (where present) also remain substantially constant.

Figure 7:
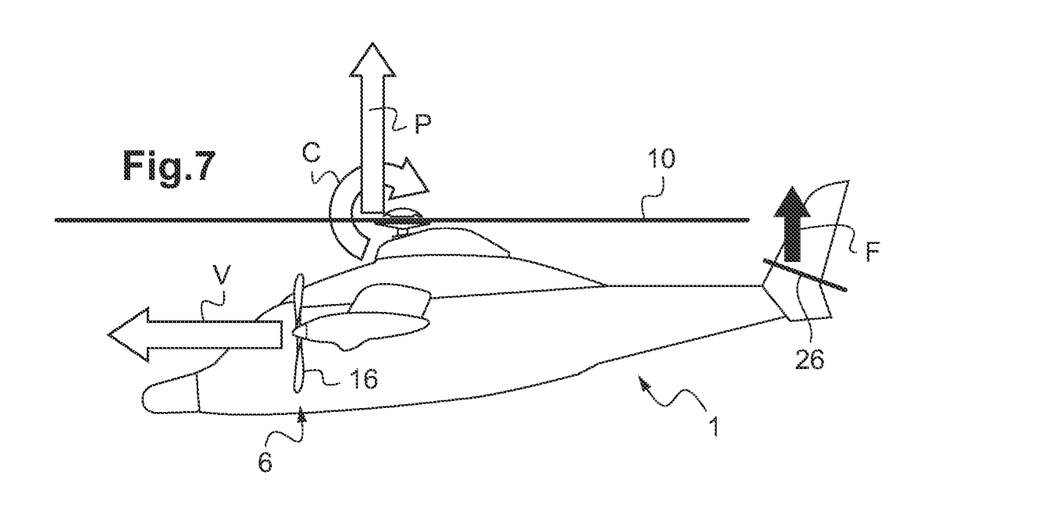

In an inverse situation shown in FIG. 7, the moveable empennage surface or surfaces 26 generate a nose-down pitching moment on the hybrid helicopter 1. To maintain a constant attitude, a cyclic nose-up pitching command is generated during the longitudinal attitude hold step. The power drawn by the lifting rotor 10 drops, and may be low, zero or negative. To keep the forward-movement speed substantially constant, the propellers 6 are then conversely loaded. The pitch of the blades 16 of the propellers 6 and/or the rotational speed thereof as well as the power drawn by these propellers then increase.

The disclosure that makes it possible to adjust the distribution of power between the lifting rotor 10 and the propeller or propellers 6, while remaining at equal incidence, equal trajectory and equal speed to achieve an optimum operating point for current flight conditions.

The method according to the disclosure is more specifically described with reference to an application including one lifting rotor 10 and two propellers 6, but can be easily transposed to an application including for example a single propeller 6 with or without a wing and/or two lifting rotors, without thereby moving outside the scope of the present disclosure.

Naturally, numerous implementation variations can be applied to the present disclosure. Although several embodiments have been described, it is understandably impossible to identify all possible embodiments exhaustively. It is clearly possible to replace any of the means described with equivalent means without thereby moving outside the scope of the disclosure.

The invention claimed is:

1. A method for controlling a hybrid helicopter, the hybrid helicopter having at least one lifting rotor provided with variable pitch blades, the hybrid helicopter having at least one forward-movement propeller provided with blades, the hybrid helicopter having an empennage provided with at least one moveable empennage surface that is designed at least to generate a pitching moment on an airframe of the hybrid helicopter, the hybrid helicopter having at least one empennage actuator for rotating the at least one moveable empennage surface, the method including a stabilized flight phase comprising a rotor adjustment phase including a longitudinal attitude hold step and a rate-of-climb hold step, as well as a propeller adjustment phase including a forward-movement-speed hold step, wherein the stabilized flight phase includes an empennage adjustment phase including the following steps:
determination, using a main sensor, of a current value of a rotor parameter conditioning a current power drawn by the lifting rotor,
determination, using an estimator, of a current setpoint of the rotor parameter, which is static or a function of a value of at least one monitoring parameter, in which the rotor parameter is a power drawn by the lifting rotor and the current setpoint is a power setpoint, or the rotor parameter is an engine torque transmitted to the lifting rotor and the current setpoint is a torque setpoint,
adjustment of a position of the moveable empennage surface using a deflection controller as a function of the current value and of said the current setpoint.

2. The method as claimed in claim 1
wherein the adjustment of a position of the moveable empennage surface includes the following steps:
determination, using the deflection controller, of a deflection instruction for the moveable empennage surface as a function of the current value and of the current setpoint,
deflection of the moveable empennage surface using the empennage actuator as a function of the deflection instruction.

3. The method as claimed in claim 1
wherein the deflection controller is a proportional-integral-derivative controller.

4. The method as claimed in claim 1
wherein the at least one monitoring parameter is a forward-movement speed of the hybrid helicopter.

5. The method as claimed in claim 1
wherein the at least one monitoring parameter is the lift generated by the lifting rotor.

6. The method as claimed in claim 1
wherein the at least one monitoring parameter is a rotational speed of the lifting rotor.

7. The method as claimed in claim 1
wherein the at least one monitoring parameter is an altitude or height of the hybrid helicopter.

8. The method as claimed in claim 1
wherein the at least one monitoring parameter is a temperature of the air outside the hybrid helicopter.

9. The method as claimed in claim 1
wherein the at least one monitoring parameter is a deflection angle of a flap of a wing in relation to a reference.

10. The method as claimed in claim 1
wherein the at least one monitoring parameter is a value representing a current mass of the hybrid helicopter.

11. The method as claimed in claim 1
wherein the method includes a suspension phase of the stabilized flight phase if at least one of the following conditions is met:
a pilot exerts a force on a cyclic-pitch control cyclically controlling the pitch of the blades of the lifting rotor,
a pilot exerts a force on a collective-pitch control collectively controlling the pitch of the blades of the lifting rotor,
a component along the earth vertical of a load factor of the hybrid helicopter is greater in absolute terms than a given load factor threshold,
a bank angle of the airframe is greater in absolute terms than a given bank threshold.

12. The method as claimed in claim 1
wherein the method includes the following steps: measurement of a measured forward-movement speed of the hybrid helicopter and comparison of the measured forward-movement speed with a predetermined speed threshold, the stabilized flight phase being implemented when the measured forward-movement speed is equal to or greater than the speed threshold.

13. The method as claimed in claim 1
wherein the method includes a step of deflecting the moveable empennage surface using the at least one empennage actuator to a safe deflection angle memorized when the measured forward-movement speed is less than the speed threshold.

14. The method as claimed in claim 1
wherein the longitudinal attitude hold step includes the adjustment of a pitch attitude angle of the airframe as a function of a reference angle by cyclical control of the pitch of the blades of the lifting rotor.

15. The method as claimed in claim 1
wherein the rate-of-climb hold step includes the adjustment of a rate of climb of the hybrid helicopter in relation to a reference vertical speed by collective control of the blade pitch of the lifting rotor.

16. The method as claimed in claim 1
wherein the dynamic of the empennage adjustment phase is slower than a dynamic of the rotor adjustment phase.

17. The method as claimed in claim 1
wherein the forward-movement-speed hold step includes the adjustment of a forward-movement speed of the hybrid helicopter as a function of a reference forward-movement speed by controlling at least the pitch of the blades of the at least one forward-movement propeller or a rotational speed of the at least one forward-movement propeller.

18. A hybrid helicopter having at least one lifting rotor provided with variable pitch blades, the hybrid helicopter having at least one forward-movement propeller provided with blades, the hybrid helicopter having an empennage provided with at least one moveable empennage surface that is designed to at least generate a pitching moment on an airframe of the hybrid helicopter, the hybrid helicopter having at least one empennage actuator to rotate the at least one moveable empennage surface,     wherein the hybrid helicopter has a system for following a trajectory at constant incidence that is designed to implement the method according to claim 1, the system for following a trajectory at constant incidence including:

the main sensor designed to measure a current value, at least one measurement system designed to determine a value of at least one monitoring parameter,     the estimator designed to determine a current setpoint,     the deflection controller designed to adjust the position of the moveable empennage surface as a function of the current value and of the current setpoint, the deflection controller being in communication with the empennage actuator.

19. The hybrid helicopter as claimed in claim 18
wherein the at least one measurement system includes at least one of the following members: a forward-movement speed sensor of the hybrid helicopter, a lift sensor generating an image signal of the lift generated by the lifting rotor, a rotational speed sensor generating an image signal of a rotational speed of the lifting rotor, an altitude or height sensor of the hybrid helicopter, a temperature sensor of the air outside the hybrid helicopter (1), an angle sensor measuring a deflection angle of a flap of a wing in relation to a reference, a deflection sensor measuring a deflection angle of the moveable empennage surface.

20. The hybrid helicopter as claimed in claim 18
wherein the hybrid helicopter includes at least one of the following members: a cyclic control force sensor generating a signal that varies when a pilot exerts a force on a cyclic-pitch control cyclically controlling the pitch of the blades of the lifting rotor, a collective control force sensor generating a signal that varies when a pilot exerts a force on a collective-pitch control collectively controlling the pitch of the blades of the lifting rotor, a load factor sensor generating a signal that varies as a function of a component along the earth vertical of a load factor of the hybrid helicopter, and a bank angle sensor.

21. The hybrid helicopter as claimed in claim 18
wherein the hybrid helicopter has a system for adjusting an attitude angle of the airframe as a function of a reference angle and a system for adjusting a rate of climb of the hybrid helicopter in relation to a reference vertical speed, the hybrid helicopter having a system for adjusting a forward-movement speed of the hybrid helicopter in relation to a reference forward-movement speed.

\* \* \* \* \*